Patented Nov. 10, 1953

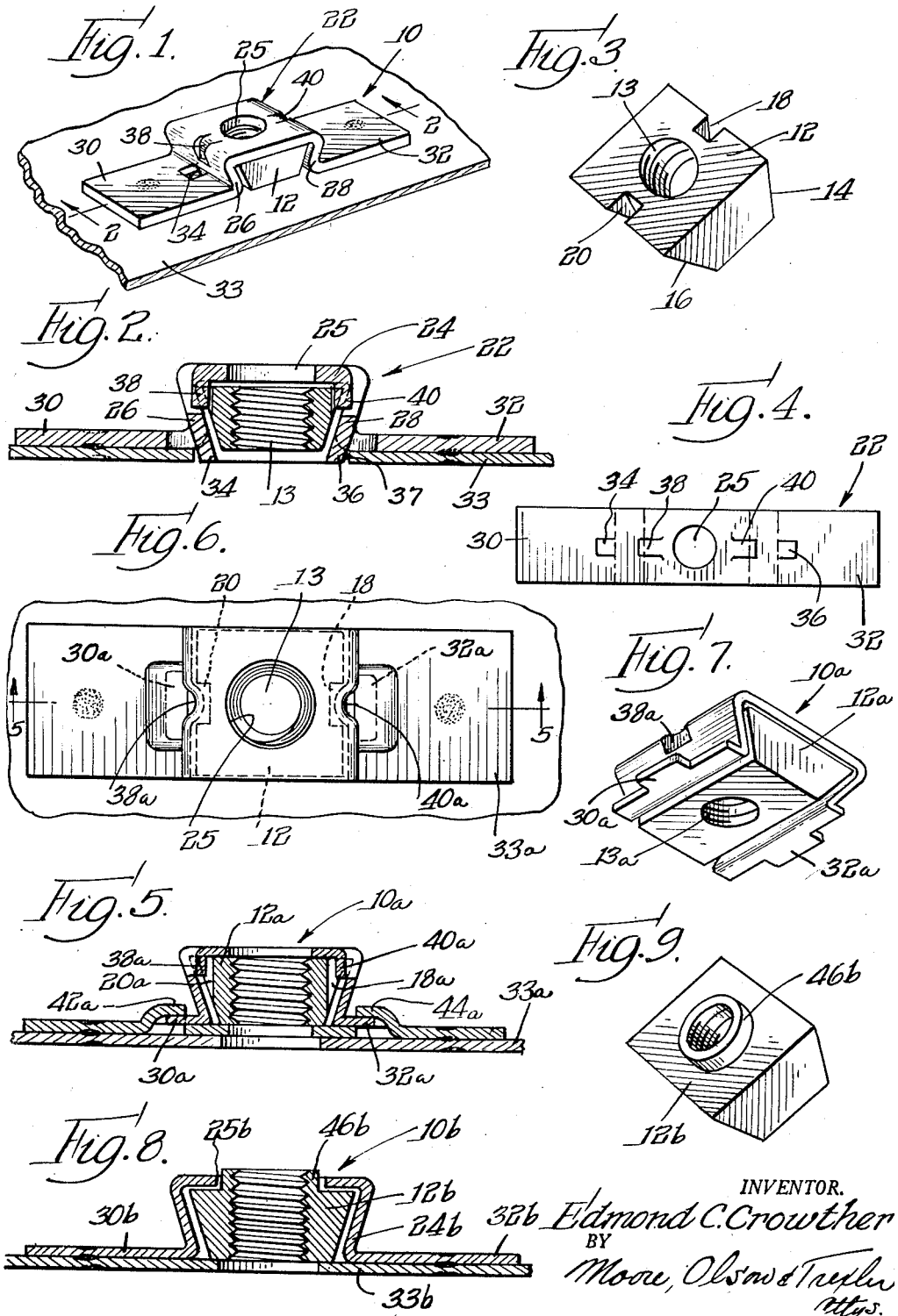

2,658,546

UNITED STATES PATENT OFFICE 2,658,546

NUT AND RETAINER ASSEMBLY

Edmond C. Crowther, Philadelphia, Pa., assignor to Illinois Tool Works, Chicago, Ill., a corporation of Illinois Application June 1, 1950, Serial No. 165,543

3 Claims. (Cl. 151—41.76)

1

This invention relates generally to a nut and retainer assembly, and more specifically to an assembly wherein the nut has tapered side walls and the nut retainer consists of a sheet metal stamping. It is an object of this invention to provide an economical nut retaining or cage device which includes a nut made from standard stock, and a sheet metal cage member requiring a minimum amount of material and presenting a very simple and practical design.

It is another object of this invention to provide a nut retainer device or assembly wherein the nut member is securely retained within and against separation from a sheet metal retainer, while at the same time providing the desired amount of "float" between the parts to facilitate registration of said nut member with a complementary screw member.

It is a further object of this invention to provide a nut retainer device of the type referred to above which permits the clamping face of the nut to be positioned immediately adjacent the work piece. This eliminates the objection found in many structures now on the market wherein one or more thicknesses of the cage member material is positioned between the work piece and the clamping surface of the nut.

It is still another object of this invention to provide a nut and retainer assembly comprised of elements which may be assembled after each of said elements has been completely fabricated.

Another object of this invention is to provide a nut retainer device having locating means to facilitate installation where the device is secured to a work piece, as by welding and the like.

These and other objects of the invention shall become more obvious from a study of the following specification in conjunction with the accompanying drawing wherein:

Fig. 1 is a perspective view of a preferred form of a nut cage device or nut and retainer assembly contemplated by the present invention;

Fig. 2 is a sectional view of the nut cage device shown in Fig. 1 and taken along the line 2—2;

Fig. 3 is a perspective view of the nut blank used in the form of nut retainer device shown in Fig. 1;

Fig. 4 is a plan view of the blank from which the sheet metal retainer member of Figs. 1 and 2 may be formed;

Fig. 5 is a cross-sectional view of another form of the nut cage device contemplated by the invention taken along the line 5—5 of Fig. 6;

Fig. 6 is a plan view of the nut and retainer assembly shown in Fig. 5;

Fig. 7 is a perspective view of the nut and retainer assembly shown in Figs. 5 and 6;

Fig. 8 discloses still another embodiment of a nut and retainer assembly of the type contemplated by the present invention; and Fig. 9 is a perspective view of the nut member used in the assembly shown in Fig. 8.

2

Referring now to the drawings wherein like numerals have been employed to designate similar parts throughout the various figures, it will be seen that a nut cage device assembly of the type contemplated by this invention is designated generally by the numeral 10.

This assembly 10 includes a nut member 12 (best seen in Fig. 3) having converging side wall portions 14 and 16 and a threaded aperture 13 extending through the body. The nut is provided with one or more recesses, herein shown as two recesses 18 and 20, in the side walls 14 and 16, respectively, of the nut.

A sheet metal retainer member 22, which forms the second element of the assembly 10 consists of a strip of sheet metal bent intermediate its ends to provide a base or bight portion 24 having a centrally located aperture 25. This aperture 25 overlies the tapped hole of the nut member 12, and arms or converging wall portions 26 and 28 adjacently superimpose the walls 14—16 of the nut. The free extremities of said strip extending from the end of said wall portions 26 and 28 provide attaching means or tabs 30 and 32. As shown in Figs. 1 and 2 the attaching means of the nut cage device or assembly 10 are adapted to be affixed to a work piece 33 by welding or riveting.

It should be noted that tabs 34 and 36, which are struck from the attaching portions 30—32 of the retainer 22, extend below the plane of said attaching portions. These tabs 26—28 are used as locators or finders and are adapted to fall into the work aperture 37 as shown in Fig. 2, thereby locating the assembly relative to the work part 33 prior to the permanent attachment thereto.

Other tabs or fingers 38 and 40 are struck from the retainer body in the vicinity of said base and extend into the recesses 18—20, respectively. These fingers are adapted to be swaged or deformed into the recesses or cavities 18 and 20 of the nut, thereby retaining the nut member against transverse or lateral separation relative to the sheet metal retainer member.

It is contemplated that in some instances the nut 12 will first be assembled with the retainer member 22, and thereafter finger means 38 and 40 deformed into cavities 18 and 20. However, in those instances where the retainer member is made of a relatively light gauge resilient material, it is contemplated that these finger means 38 and 40 may be formed before assembly of the parts. In such instances the nut may be snapped into position within the retainer member.

Fig. 5 shows another embodiment of the invention, and in all respects, with the exception of the attaching means 30a and 32a, is the same as the device shown in Fig. 1. In this embodiment, as is best seen in Fig. 6, the attaching means 30a and 32a are in the form of tabs or lugs. It is contemplated that the nut may fit loosely within the body of the sheet metal retainer member 20a, and therefore sufficient space between the nut body 12a and the retainer member is afforded to allow flexing of the walls of the retainer body, thereby permitting the attaching portions 30a and 32a to enter the work aperture. Upon being released the portions 30a—32a will engage the undersurface of the panel to retain the assembly in mounted position on the panel 33.

It should be noted that the disclosure in Fig. 5 includes depressed portions 42a and 44a providing recesses for accommodating the attaching portions of the retainer so as to eliminate projection of the attaching portions below the general plane of the under-surface of the work piece. This permits the work assembled therewith to be brought into flush contact with the undersurface of the work piece. As previously indicated the finger portions 38a and 40a, in this embodiment, are specially formed to permit assembly of the nut into the completely formed and finished retainer member. This is accomplished by transversely arching the fingers 38a and 40a, Fig. 6, thereby providing the fingers with cam surfaces so that the nut may be passed between and beyond the fingers until said fingers are opposite the recesses 18a and 20a, when they will snap into these recesses and retain the nut in permanent assembly.

In Figs. 8 and 9 still another embodiment of the nut cage device 10b is shown. In this embodiment a collar 46b is provided on the nut body 12b and serves as the retaining means to prevent lateral or transverse separation of the nut relative to the retainer member 24b. Obviously in this form the finger portions 38 and 40, as shown in Fig. 1, are eliminated as well as the recesses 18 and 20 in the nut member, as shown in Fig. 3. The aperture 25b in the retainer member has a larger dimension than the external diameter of the collar, thereby permitting the nut member to "float" within the retainer member 24b. The attaching means 30b and 32b, as disclosed, are adapted for welding or riveting but it is contemplated that this form of nut cage device might also be equipped with retainer means of the type disclosed in Figs. 5 and 6, as described above.

In all of the forms disclosed, for purposes of illustrating the invention, it will be noted that the assembly contemplated is of the simplest design and may be very economically produced.

All of the cage members are simple stampings and may be stamped from sheet material of uniform width throughout its entire length or substantially its entire length. This renders the production of these devices extremely simple and with substantially no scrap. The assembly, from the standpoint of the person who will subsequently use these devices, presents many features which should be of great advantage. First the assembly is not easily taken apart and, therefore, in shipping and handling such problems as disassociation of the elements is not possible. Secondly, these devices with their locator tabs make the assembly of the article to an apertured work part extremely simple and accurate. Further, the abiilty to fabricate these nut cages with various types of attaching means makes the article adaptable to the various types of installations for which this part will be produced.

The "float" feature of the nut member relative to the retainer body for permitting alignment of the nut to facilitate threading of a screw therein also provides an important feature. These devices are usually installed in blind installations where the operator installing the subsequent male screw member is unable to reach the panel on which the nut cage device is assembled to make the adjustments. The fact that this assembly also retains the nut member positively against rotary movement, thereby permitting its use in blind installations is of primary importance.

Obviously, the invention is not limited to the specific structural details illustrated herein, but is capable of other modifications and changes coming within the scope of the appended claims.

The invention is hereby claimed as follows:

1. A nut and retainer assembly, comprising a solid rectangular nut having a pair of opposed tapered side walls each provided with an axially extending narrow recess through its wider marginal edge, a sheet metal retainer comprising a strip of uniform width having a portion superimposing the nut face of maximum area and tapered side walls complementary to and enclosing the tapered side walls of the nut and providing open ends through which the nut and retainer member may be mutually assembled, the superimposing portion of the retainer member having a bolt-receiving aperture therethrough, said tapered side walls of the nut and the superimposing portion of the retainer member and the complementary side walls of the retainer member cooperating to prevent axial separation of the nut and retainer member while permitting lateral assembly, deformable fingers struck from within the outer and wider margins of said retainer member and disposed in alignment with and extending downwardly into said axially extending recesses for interfitting the nut and retainer member and preventing lateral separation thereof, and means for attaching said retainer member to a work piece and including a base portion extending outwardly from the ends of the tapered side walls of the retainer member adjacent the nut face of minimum area and tabs projecting downwardly from said base portion and adapted to enter a work piece aperture for positioning the assembled nut and retainer member with respect thereto.

2. A nut and retainer assembly as claimed in claim 1, wherein said tabs projecting downwardly from the base portion are struck from the base portion.

3. A nut and retainer assembly as claimed in claim 1, wherein said tabs projecting downwardly from said base portion converge toward each other to facilitate entry into the work piece aperture.

EDMOND C. CROWTHER.

References Cited in the file of this patent

UNITED STATES PATENTS

| Number | Name | Date |
|---|---|---|
| 1,760,834 | Carr | May 27, 1930 |
| 1,768,505 | Carr | June 24, 1930 |
| 1,805,460 | Carr | May 12, 1931 |
| 2,385,991 | Huntoon | Oct. 2, 1945 |
| 2,448,902 | McKenzie | Sept. 7, 1948 |

FOREIGN PATENTS

| Number | Country | Date |
|---|---|---|
| 555,783 | Great Britain | Sept. 7, 1943 |
| 556,419 | Great Britain | Oct. 4, 1943 |
| 597,569 | Great Britain | Jan. 29, 1948 |
| 607,872 | Great Britain | Sept. 7, 1948 |